Figure 1:
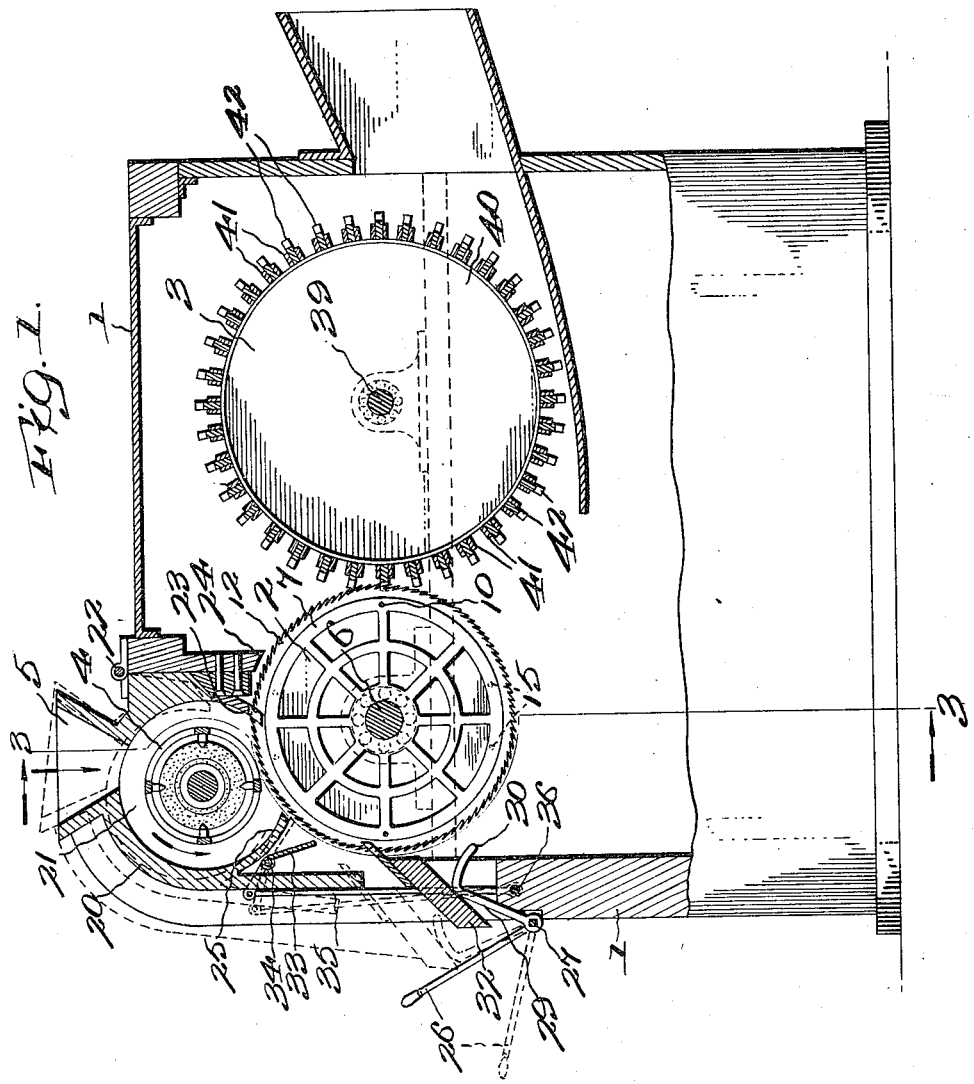

G. L. BLANCHARD.
LINTER AND COTTON GIN.
APPLICATION FILED JAN. 14, 1914.

1,125,049.

Patented Jan. 19, 1915.
3 SHEETS—SHEET 1.

Witnesses
Edwin J. Beller.
H. W. Primm.

Inventor
George L. Blanchard,
by Wilkinson, Giusta & Mackay
Attorneys.

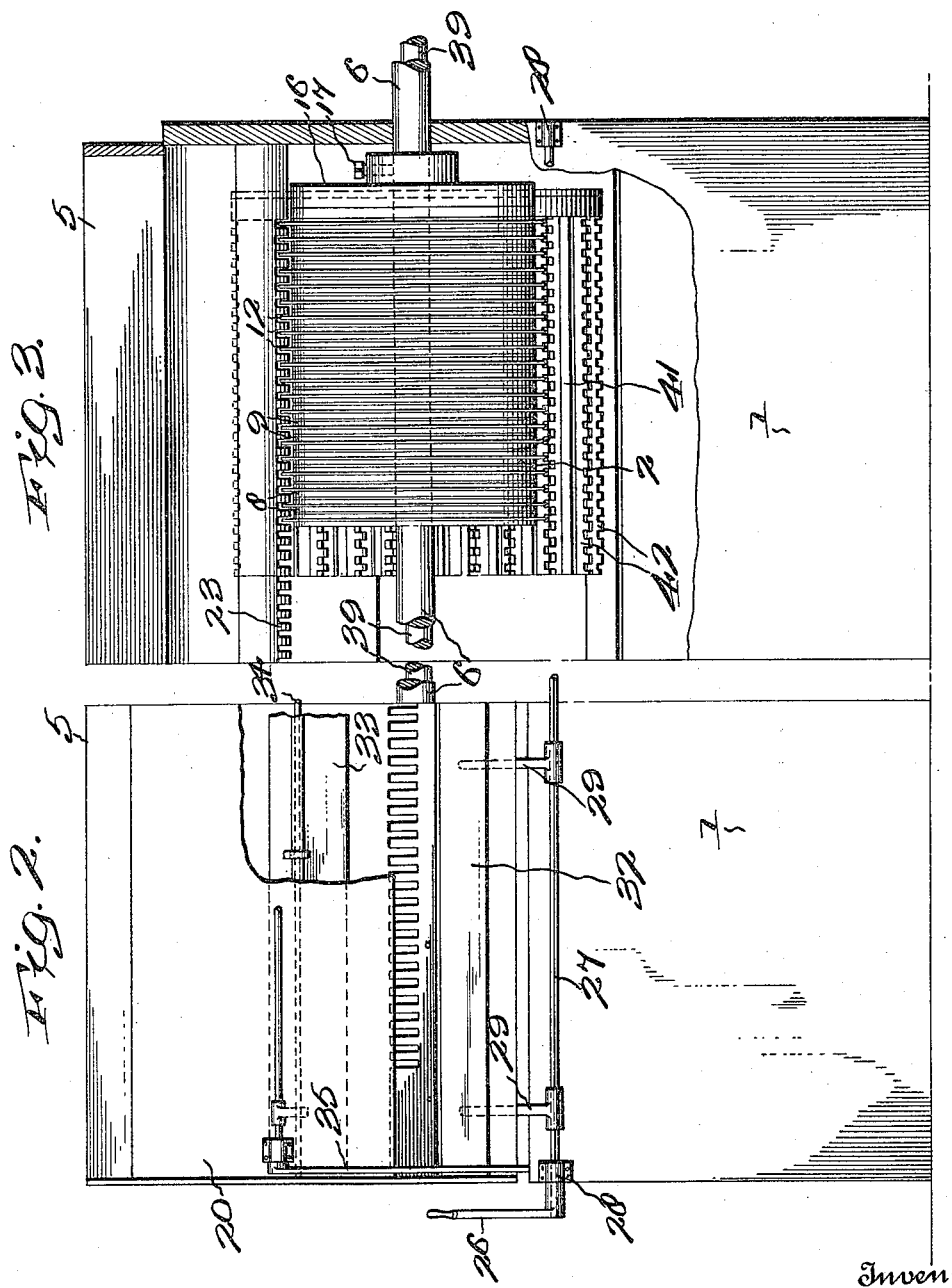

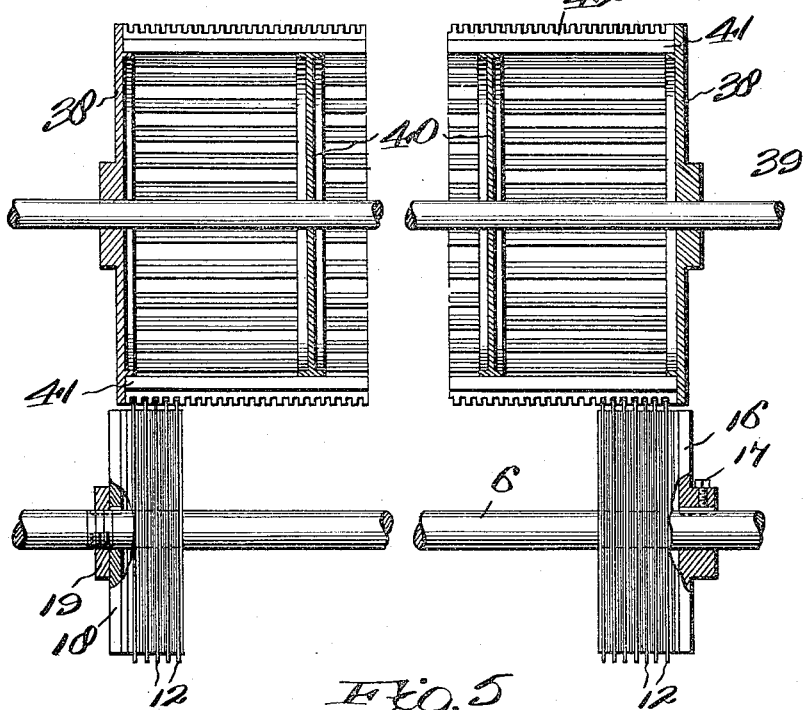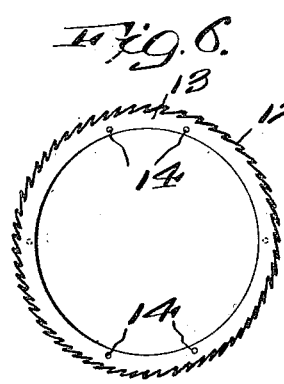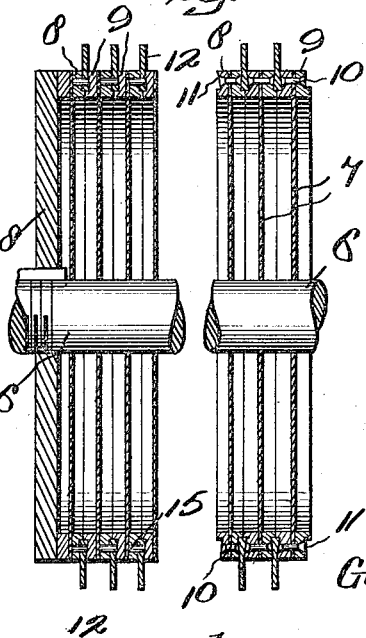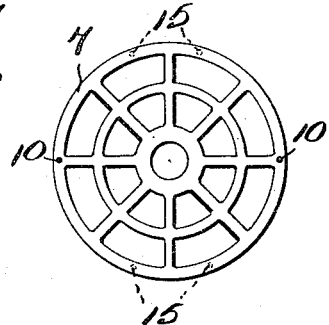

UNITED STATES PATENT OFFICE.

GEORGE L. BLANCHARD, OF MONTGOMERY, ALABAMA, ASSIGNOR TO BLANCHARD DELINTER CO., OF MONTGOMERY, ALABAMA, A CORPORATION OF ALABAMA.

LINTER AND COTTON-GIN.

1,125,049.      Specification of Letters Patent.      Patented Jan. 19, 1915.

Application filed January 14, 1914. Serial No. 812,075.

*To all whom it may concern:*

Be it known that I, GEORGE L. BLANCHARD, a citizen of the United States, residing at Montgomery, in the county of Montgomery and State of Alabama, have invented certain new and useful Improvements in Linters and Cotton-Gins; and I do hereby declare the following to be a full, clear, and exact description of the invention, such as will enable others skilled in the art to which it appertains to make and use the same.

The present invention relates to cotton gins and cotton seed linters, and has for its purpose to provide a machine for removing lint from cotton seed, and a construction of saw cylinder therefor wherein a greater number of saws may be used on the cylinder than is now possible; one in which the saws are formed from narrow strips of light weight and low cost, which can easily be removed when dulled and new ones quickly substituted therefor, and which will have maximum durability and capacity in themselves, and avoid wearing the coöperating brush cylinder.

A further purpose of the invention is to produce a saw cylinder wherein the saws are mounted in a manner permitting of their being readily assembled and disassembled, and in which any individual saw may be removed or replaced without appreciably disturbing the other saws.

It is further proposed to construct the several saws of the cylinder from the ring sections of a spirally wound steel strip, whereby to economize in the cost of saw production and produce a cylinder of comparatively light weight and greater durability and effectiveness.

Another object of the invention is to provide a brush cylinder wherein leather strips are employed in lieu of bristles, to the end of more perfectly removing the lint from the saw teeth, and less liable to wear away adjacent the saws.

The linter breast is provided with automatically operated means for retaining the cotton seed when the linter breast is raised to stop the linter.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a longitudinal sectional view of a cotton seed linter constructed in accordance with the present invention. Fig. 2 is a front elevational view of the same partly broken away for clearness. Fig. 3 is a transverse sectional view of Fig. 1, taken approximately on the line 3—3 thereof, and looking in the direction of the arrows. Fig. 4 is a top plan view partly in section, and with parts removed, of the saw and brush cylinders. Fig. 5 is a longitudinal sectional view showing the construction and manner of assembling the saw cylinder. Fig. 6 is an elevational view of one of the saws; and Fig. 7 is an elevational view of one of the saw supporting plates.

Referring to the construction and arrangements of parts in detail, the linter machine (see Fig. 1) comprises a suitable casing 1, having mounted therein the saw cylinder 2, the brush cylinder 3, and the float 4 to which the seed is fed from the hopper 5. The arrangement shown herein illustrates the application of the invention to a linter machine, but this election is for illustrative purposes only, inasmuch as the invention is applicable to cotton gins.

The float 4, which agitates and acts upon the seed to remove the lint, is of that type disclosed in my co-pending application for United States patent bearing Serial No. 804,045, filed December 1, 1913, and for a detailed description of which reference may be had thereto. A float of the usual construction may also be used.

The saw cylinder 2 is mounted on a shaft 6 (see Figs. 4 to 7) and comprises a plurality of disks, or plates 7, of frame design, that are fitted on the shaft 6, and have mounted on their peripheral edges each a pair of rings 8 and 9 that are secured thereto by rivets 10. The respective opposite faces of said rings are grooved, as at 11, whereby to provide a channel of substantially dovetail design, when the several rings of the supporting plates 7 are assembled on the shaft 6. The saws 12 consist each of a ring blade divided at one point 13, whereby to be readily inserted and removed, and formed with apertures 14 to receive the pairs of studs or pins 15 carried by each pair of rings 8 and 9. A head 16, forming one end of the cylinder, is mounted on the shaft 6 and secured thereto by a screw 17, and at its opposite end said cylinder has an adjustable head 18 that is regulated and secured by a nut 19 screw-threaded on the shaft 6 (see Fig. 4).

In the ordinary construction of saw cylinders it is necessary to re-sharpen the saws frequently when they become dull, and for this purpose the heavy saw cylinder is removed with great labor to the saw filing machine, and a newly sharpened cylinder replaces the removed cylinder in the linter. In the present construction there will be no necessity for removing the saw cylinder for the purpose of renewing the saws, since it is necessary only that the head 18 be moved along the shaft 6 a distance sufficient to allow of the saw or saws 12 to be removed and new saws inserted in place thereof.

The several saws 12 are designed to avoid the many disadvantages attending the use of the ordinary saws of the disk type, to wit: The prime advantage of the use of these strip saws is in the low cost of the same, and this is brought about by the new process for their manufacture. It is entirely possible to make these strip circular saws from solid metal, stamping them out in the same dimensions, but the prime cost of same would be too great, as well as a great loss in stamping. Such stamped strips may be used on the saw cylinder, if a single opening be made on the saw to allow of its being put in place. Such a stamped saw, however, would not have a wedge-shaped section, as the special strip saws possess. When manufactured according to the new process which is here given, instead of using flat tool steel as now employed, the new process uses a narrow strip steel in a continuous straight length. A suitable soft annealed steel is used, either low or high in carbon, which will admit of its being hardened or tempered either before or after the circles are formed. The endless coil of strip steel is fed into powerful rolls, which by a slight angular set of the face of the rolls, forces the strip steel to bend in a circular form. At the same time, the rounded strip steel is wound upon a revolving mandrel, which retains the required shape of the circle desired to be made. The strip steel is thus wound on edge in a continuous coil, and a section of the same will therefore be wedge-shaped. This will be thicker on the inside diameter and thinner on the outside circumference. The value of this wedge-shaped section is that it can be better gripped when mounted on the space-block on the saw cylinder, as elsewhere described.

The mandrel employed in the forming of the circular coils is smaller than would ordinarily be required, owing to the springing out of the strip coils when they are taken off. By proper adjustment in size of the mandrel, the exact inside diameter of such coils can easily be secured. The next step is in cutting apart these coils at the proper location, so as to form single coils. Such single coils will be in the shape of a strip circle with one opening, as described. They can also be cut apart to make two or more sections, but whole saws with one opening are preferred. The teeth are now cut upon the outer edge of the strip circle, and the pitch and shape of the same will depend on the particular service desired. The circular strip saw thus made, is now drilled with the holes required to secure the saws upon the space-blocks on the saw cylinder. The teeth could also be cut on the straight strip steel before it is formed into circular shape. And it is then hardened or tempered, in accordance with the particular use desired. The cheapness of construction will admit of these saws being thrown aside when they become dull after long usage. It will not be found practical to sharpen them on account of the temper and hardness of the same, and it will therefore be cheaper and better to supply new ones. While this process is contemplated for linter saws and cotton gin saws, it is also adapted to the manufacture of any other kind of circular saw having similar requirements.

The circular saws in present use are of solid tool steel, stamped from a flat sheet which causes considerable waste in stamping out. The improved strip steel saw is of very light weight and can be made without any loss of metal, and sold at a fraction of the cost of the solid saws.

The strip saws are made of tempered steel, and can be operated several weeks and months at a time without losing their sharpness. The effective work of the saw cylinder is thus maintained throughout almost its whole period of operation. This cheapness of manufacture will admit of their being thrown aside when they become slightly dull, and new ones easily substituted. The present used saws become dull after one or two days' operation, and must be re-sharpened to become effective. In practice, this is done every three or four days or oftener at a considerable cost and loss of time. Also when their diameter becomes too small for economical operation, they are thrown away and of no value.

The strip saws are always of the same maximum diameter, and this is of material advantage, to wit: The solid saws as now used are continually being re-sharpened and soon are reduced in diameter with a consequent reduction in effectiveness, as the peripheral speed of the teeth is continually reduced, and consequently the linter becomes defective. As each linter does not have its individual saw cylinder at all times, the re-sharpening of the cylinders and interchanging them upon all the linters, results in a variation of the diameter of the different saw cylinders. This interferes materially with the operation of the linters, as it is impossible to keep them in proper adjustment to conform to all sizes of saws. With the strip saw cylinder and its permanent location in the same linter, this variation does not occur, and the linter once adjusted, remains the same, thereby securing its maximum effect at all times. The strip saws can easily be removed, either singly or throughout the cylinder, and all can be changed in a considerably short time, whereas the re-sharpening of the present saw cylinder requires approximately half a day, while the linter is kept in operation with another of the so-called interchangeable cylinders.

The present saw cylinder, by constantly being interchanged from one linter to another, may not exactly fit the several linters, and consequently almost always there is more or less friction of the saws upon the adjacent ribs. This causes a great loss of power, and also produces a continual wearing of both ribs and saws, and as a consequence small seed are dropped between the worn ribs, and thus lost in the motes. The strip saws as made and operated, entirely prevent these difficulties. The strip saws project only three-eights of an inch above the space-blocks, and are rigid and kept in place without movement against the other parts of the linter while the usual saws project $1\frac{1}{8}$ inches above the ribs and are easily forced against the ribs by the seed packing between them, thus producing the friction above mentioned, and the loss of seed.

The strip saws by maintaining the full maximum diameter keep the proper adjustments between them and the division board separating the saw cylinder and brush cylinder. The brush cylinder thus always does its proper work in deflecting the air in a circular motion, and properly carries the lint through the lint flue to the condenser. In the case of the solid saws now used, which become worn in re-sharpening, and are reduced in diameter this effects the adjustment of the division board by leaving an open space between the saws and board, and thus allow a draft of air to force its way on the saws, and causes some of the lint to be wasted by dropping in the motes. As the strip saws do not require to be re-sharpened, it is practical to place them much closer together on the cylinder, thereby increasing the capacity of the linter without increasing its length. The present solid or disk saws cannot be placed nearer together than $\frac{3}{16}''$ on the cylinder, because the files of the filing machines cannot re-sharpen the saws if operated at a closer distance. A breast 20, of the roll box 21, is hingedly mounted at 22 to the casing 1, and a notched plate or bar 23 is fixedly mounted on the beam 24 of the casing (see Fig. 1) and provides the fingers for engaging between the saws of the cylinder and hold the seed in the roll box, after the usual manner, while the linter is in operation. And in this function said fingers are assisted by the projecting ledge 25 of the roll box, which extends for the full length of the saw cylinder, and in close proximity to the saw teeth.

The breast 20 is adapted to be raised through the medium of a lever 26 that is secured to a shaft 27 journaled in suitable bearings 28 in the casing 1, and carries a pair of arms 29 that have angular or projecting end portions 30 that act after the manner of cams. The two arms 29 are designed to engage with the inclined chute 32 that receives the delinted seed, and said chute 32 forms a permanent part of the movable section or breast 20 of the roll box. It will, therefore, be seen that the movement of the lever 26 to the position indicated in Fig. 1, will effect to raise the breast 20 from the position shown to that also indicated.

The means for holding the seed in the roll box when the breast 20 is raised, consists of a strip or plate 33 that is swingingly mounted on the shaft 34, and has its free edge formed with notches to receive the several saws, as will be understood. The notched plate 23 is adapted to be automatically moved into operative position through the medium of a pair of levers 35 that are fulcrumed to the casing 1 at the points 36, and are adapted to swing from the position shown to that indicated in Fig. 1, since the upper ends of the levers are connected to and move with the breast 20. While the linter is in operation the seed retaining strip or plate 33 hangs freely without interfering with the escape of the linted seed through the chute 32.

The brush cylinder (see Figs. 1 and 4) consists of two metallic heads or cylinder ends 37 and 38, mounted and suitably secured on the shaft 39 that is journaled in the casing 1, and between said heads are mounted one or more supporting members 40, likewise secured to the shaft 39. A plurality of pairs of strips 41, preferably of sheet steel, are mounted at uniform intervals on the drum, and between each pair of said strips is secured a strip of leather 42 formed with notches or gaps to receive the teeth of the saw, as in the manner illustrated in Fig. 4. Said leather strips have for their purpose to remove the lint from the teeth of the saw after the manner of the usual brush bristles. In the present construction it is proposed to mount both the saw and brush cylinders permanently within the casing, and on anti-friction ball or roller bearing, to the end of avoiding irregular relative movement therebetween, as frequently occurs with the present method of mounting these cylinders where they are being constantly replaced, as heretofore stated. The gaps or notches in the leather strips will, therefore, at all times properly register with the teeth of the saw strips, and consequently not become ragged or irregular.

It is obvious that those skilled in the art may vary the details of construction and arrangement of parts without departing from the spirit of my invention, and therefore I do not wish to be limited to such features except as may be required by the claims.

I claim:—

1. In a machine for removing lint from cotton seed, the combination of a casing; a seed box mounted on said casing and having a movable section; means on said seed box for holding the seeds therein; a device for moving the movable section of the seed box; auxiliary means for holding the seed within the seed box; means for automatically moving said auxiliary means in operative position on the movement of said movable box section; and means for treating the cotton seed within the casing, substantially as described.

2. In a machine for removing lint from cotton seed, the combination of a casing; a seed box mounted on said casing and having a movable section; means on said seed box for holding the seeds therein; a lever mechanism for moving the movable section; auxiliary seed retaining means mounted on the movable section; means connecting said auxiliary means with the casing whereby to automatically move said auxiliary means to operative position through the movement of said movable section; and means for treating the cotton seed within the casing, substantially as described.

3. In a machine for removing lint from cotton seed, the combination of a casing; a seed box mounted on said casing and having a movable section; means on said seed box for holding the seeds therein; a chute for carying off delinted seed mounted on the movable section; a shaft journaled on the casing; arms mounted on said shaft and adapted to engage with said chute to move the movable section; an actuating lever for said shaft; auxiliary seed retaining means mounted on the movable section; rods connecting said auxiliary means to said casing and automatically operable through said movable section to move said auxiliary means into operative position; and means for treating the seed within the casing.

4. In a machine for removing lint from cotton seed, the combination of a casing; a seed box mounted on said casing and having a movable section; means on said seed box for holding the seeds therein; a chute for carrying off the delinted seed mounted on said movable section; a shaft mounted on the casing; arms mounted on said shaft and adapted to engage with said chute to move the movable section; an actuating lever for said shaft; a saw cylinder located beneath the seed box; an auxiliary seed retaining device comprising a notched plate swingingly mounted on said movable section and adapted to engage between the saws of said saw cylinder, rods connecting said auxiliary device with said casing and adapted to automatically move said device to operative position through said movable section; and a brush cylinder coöperable with said saw cylinder, substantially as described.

In testimony whereof, I affix my signature, in presence of two witnesses.

GEORGE L. BLANCHARD.

Witnesses:
G. K. WITMER,
HUGH WADSWORTH.

Copies of this patent may be obtained for five cents each, by addressing the "Commissioner of Patents, Washington, D. C."